(12) United States Patent
Xiong

(10) Patent No.: US 11,448,374 B2
(45) Date of Patent: Sep. 20, 2022

(54) SOLAR LAMP

(71) Applicant: SHEN ZHEN LAMHO PHOTOELECTRICITY & TECHNOLOGY CO., LTD, Shenzhen (CN)

(72) Inventor: Taohua Xiong, Fuzhou (CN)

(*) Notice: Subject to any disclaimer, the term of this patent is extended or adjusted under 35 U.S.C. 154(b) by 0 days.

(21) Appl. No.: 17/449,665

(22) Filed: Sep. 30, 2021

(65) Prior Publication Data
US 2022/0018506 A1 Jan. 20, 2022

(30) Foreign Application Priority Data
Jun. 24, 2021 (CN) .......................... 202121417915.4

(51) Int. Cl.
F21S 9/03 (2006.01)
F21V 17/10 (2006.01)
F21V 21/08 (2006.01)
F21Y 105/18 (2016.01)
F21Y 115/10 (2016.01)

(52) U.S. Cl.
CPC ............ F21S 9/037 (2013.01); F21V 17/101 (2013.01); F21V 21/0824 (2013.01); *F21Y 2105/18* (2016.08); *F21Y 2115/10* (2016.08)

(58) Field of Classification Search
CPC .... F21S 9/037; F21V 17/101; F21V 21/0824; F21Y 2105/18; F21Y 2115/10
See application file for complete search history.

(56) References Cited

U.S. PATENT DOCUMENTS

| 5,062,028 A * | 10/1991 | Frost ...................... F21S 9/037 |
| | | 362/183 |
| 10,156,777 B1 * | 12/2018 | Altamura .................. F21S 4/10 |
| 10,168,010 B1 * | 1/2019 | Hsu .......................... F21S 6/005 |
| 10,724,190 B1 * | 7/2020 | Majdalawi .............. F21S 9/037 |
| 10,995,918 B1 * | 5/2021 | Hwang ..................... F21V 5/00 |
| 2003/0137831 A1 * | 7/2003 | Lin ..................... F21V 23/0442 |
| | | 362/153.1 |
| 2005/0281031 A1 * | 12/2005 | Fu .......................... E01F 9/559 |
| | | 362/253 |
| 2006/0044785 A1 * | 3/2006 | Lee .......................... F21S 8/00 |
| | | 362/276 |
| 2009/0168411 A1 * | 7/2009 | Yen ..................... F21V 21/0824 |
| | | 362/183 |
| 2010/0254120 A1 * | 10/2010 | Tseng ...................... A43B 3/34 |
| | | 362/183 |
| 2013/0049609 A1 * | 2/2013 | Browder ................. F21S 9/037 |
| | | 315/159 |
| 2013/0094191 A1 * | 4/2013 | Cohen ..................... F21V 21/08 |
| | | 362/122 |
| 2015/0192260 A1 | 7/2015 | Muehlemann et al. |
| 2019/0128486 A1 * | 5/2019 | Hollinger ................ F21S 9/037 |

(Continued)

Primary Examiner — Bryon T Gyllstrom
Assistant Examiner — Christopher E Dunay

(57) ABSTRACT

The invention discloses a solar lamp, including a base, a light source, a power unit, a lampshade, and a solar panel, wherein the lampshade is buckled on the base to form an accommodating space; the light source, the power unit, and the solar panel are all disposed in the accommodating space; the power unit is electrically connected to the solar panel and the light source; and the lampshade is made of a light-permeable material, wherein a plurality of light guide elements for guiding light are disposed on an outer side the lampshade.

6 Claims, 5 Drawing Sheets

(56) References Cited

U.S. PATENT DOCUMENTS

2019/0323669 A1 10/2019 Tang et al.
2020/0240626 A1 7/2020 Ko
2020/0258384 A1* 8/2020 Suh ..................... G08G 1/095

* cited by examiner

SOLAR LAMP

BACKGROUND OF THE INVENTION

1. Technical Field

The invention relates to the field of illuminating lamps, and in particular, relates to a solar lamp.

2. Description of Related Art

Generally, an existing lamp is supplied with power by a battery, which is replaced when wearing out. As such, the supply of power is unstable, and the continuous illumination capability of a light source cannot be ensured. Afterwards, solar lamps have come into existence. However, the existing solar lamp is less reasonable in structural design and has an illuminating effect that needs to be improved. Moreover, the appearance effect of the existing solar lamp is not in line with the aesthetic trend of modern people. Furthermore, the existing solar lamp is not adjustable in many illuminating angles, and is inconvenient to use.

Therefore, there is a need of developing a new technical solution to solve the problem described above.

BRIEF SUMMARY OF THE INVENTION

To overcome the foregoing defects and shortcomings in the prior art, the invention provides a solar lamp, which is reasonably designed to ensure sufficient power and stable operation as compared with a traditional lamp, and which further effectively increases the ornamental value of the lamp and keeps in line with the aesthetic trend of people by arranging a plurality of light guide elements on a lampshade to guide light emitted by a light source.

To achieve the object above, the invention employs the following technical solution: a solar lamp includes a base, a light source, a power unit, a lampshade, and a solar panel, wherein the lampshade is buckled on the base to form an accommodating space; the light source, the power unit, and the solar panel are all disposed in the accommodating space; the power unit is electrically connected to the solar panel and the light source; and the lampshade is made of a light-permeable material, wherein a plurality of light guide elements for guiding light are disposed on an outer side the lampshade.

As a preferred solution, the power unit includes a circuit board and an accumulator battery electrically connected to the circuit board; the solar panel is electrically connected to the circuit board; and the solar panel during working converts solar radiation energy into electric energy to charge the accumulator battery via the circuit board.

As a preferred solution, the circuit board is annular, and the light source includes a plurality of LED beads that are arranged at interval along an outer edge of the circuit board.

As a preferred solution, the lampshade is provided with lenses at positions corresponding to the LED beads, and the lenses are semi-spherical convexly upwards.

As a preferred solution, the lampshade is ultrasonically welded on the base.

As a preferred solution, the solar lamp further includes a support element, which is detachably connected to an underside of the base.

As a preferred solution, the support element is provided with a connecting element, which is rotatably disposed on the support element, wherein the base is connected to the connecting element, such that the base is rotatably disposed relative to the support element.

As a preferred solution, the base is provided with a power interface, which is electrically connected to the power unit.

As a preferred solution, the lampshade is circular, the light guide elements are circumferentially arranged at interval along an outer edge of the lampshade, and the light guide elements are petal-shaped.

The invention has significant advantages and beneficial effects as compared with the prior art. Specifically, as can be known from the foregoing technical solutions, the solar lamp can ensure sufficient power and stable operation mainly by its specific design as compared with a traditional lamp; and furthermore, the plurality of light guide elements are disposed on the lampshade to guide light emitted by the light source, which effectively increases the ornamental value of the lamp and keeps in line with the aesthetic trend of people.

Then, the support element is disposed, and the solar lamp when rotating is connected to the support element, such that the solar lamp according to the invention can be adjusted in illuminating angle, thereby achieving convenience in use.

Moreover, the lampshade is provided with the lenses at the positions corresponding to the LED beads, such that the illuminating effect is further improved and the utilization rate of the LED beads is increased.

In order to set forth the structural features and functions of the invention more clearly, the invention will be illustrated in detail below in conjunction with the accompanying drawings and specific embodiments.

DETAILED DESCRIPTION OF THE INVENTION

The technical solutions in the embodiments of the invention will be described clearly and completely below in conjunction with the accompanying drawings. Obviously, the embodiments described are merely some of rather than all of the embodiments of the invention. Based on the embodiments of the invention, every other embodiment achieved by those ordinarily skilled in the art without making creative efforts shall fall within the protection scope of the invention.

It should be noted that all directional indications (such as, up, down, left, right, front, back, top, bottom, inside, outside, vertical, horizontal, longitudinal, counterclockwise, clockwise, circumferential, radial, axial, . . . ) involved in the embodiments of the invention only serve to explain a relative positional relationship, a motion condition and the like between various components under a specific posture (as shown in the accompanying drawings). If the specific posture changes, the directional indications change therewith accordingly.

In addition, the descriptions such as "first" or "second" involved in the embodiments of the invention are merely for a descriptive purpose, and shall not be construed as indicating or implying their relative importance or implicitly indicating the number of technical features indicated. As such, the features defined by "first" and "second" can explicitly or implicitly include at least one of said features. In addition, the technical solutions of various embodiments can be mutually combined, which must be based on the fact that it is implementable for those skilled in the art. When the technical solutions are in conflict during the combining or the combination is not achievable, it should be considered that such a combination does not exist and is not within the protection scope claimed by the invention.

Figure 1:
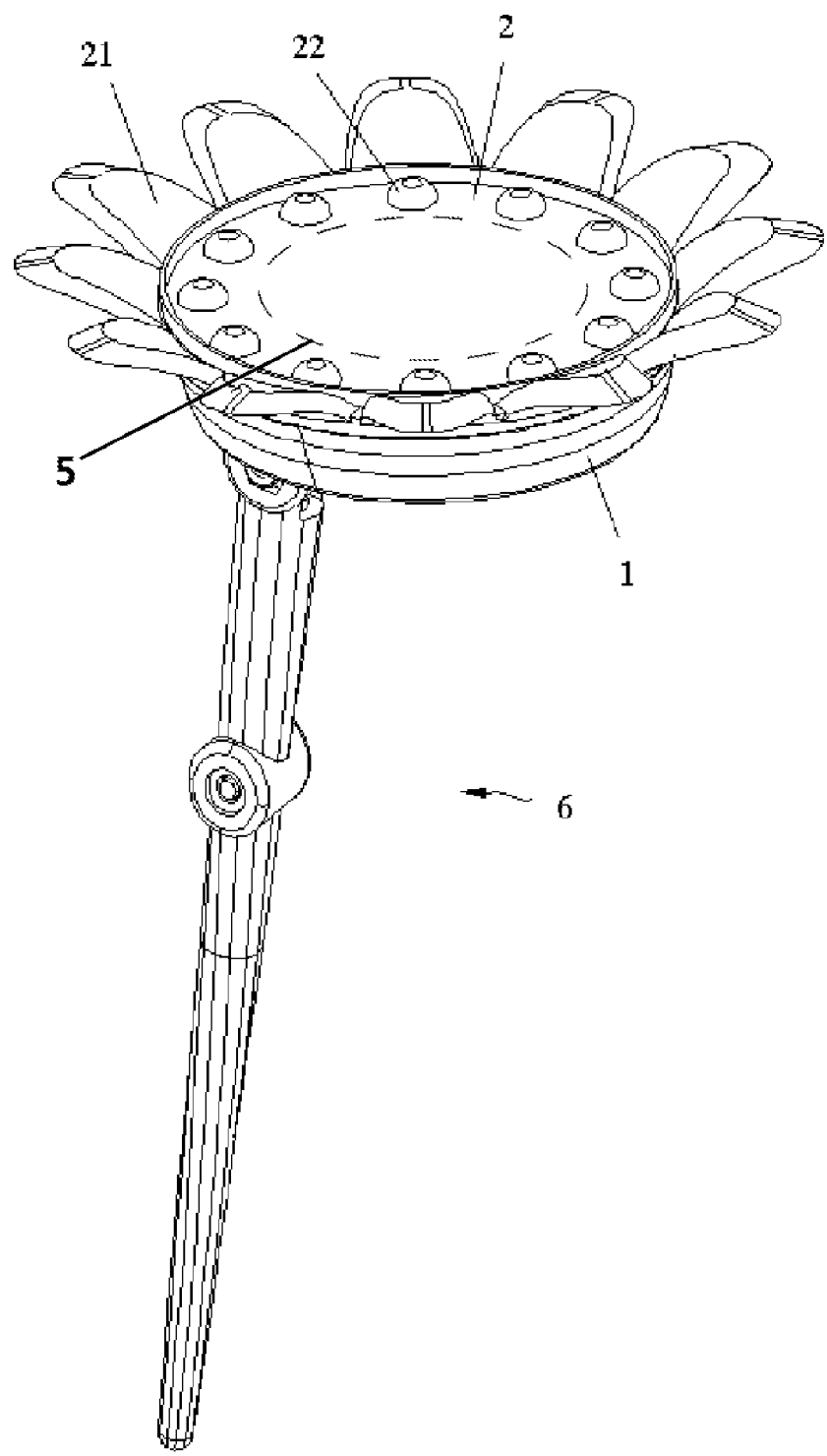
FIG. 1 is a perspective view of an embodiment according to the invention.
Figure 2:
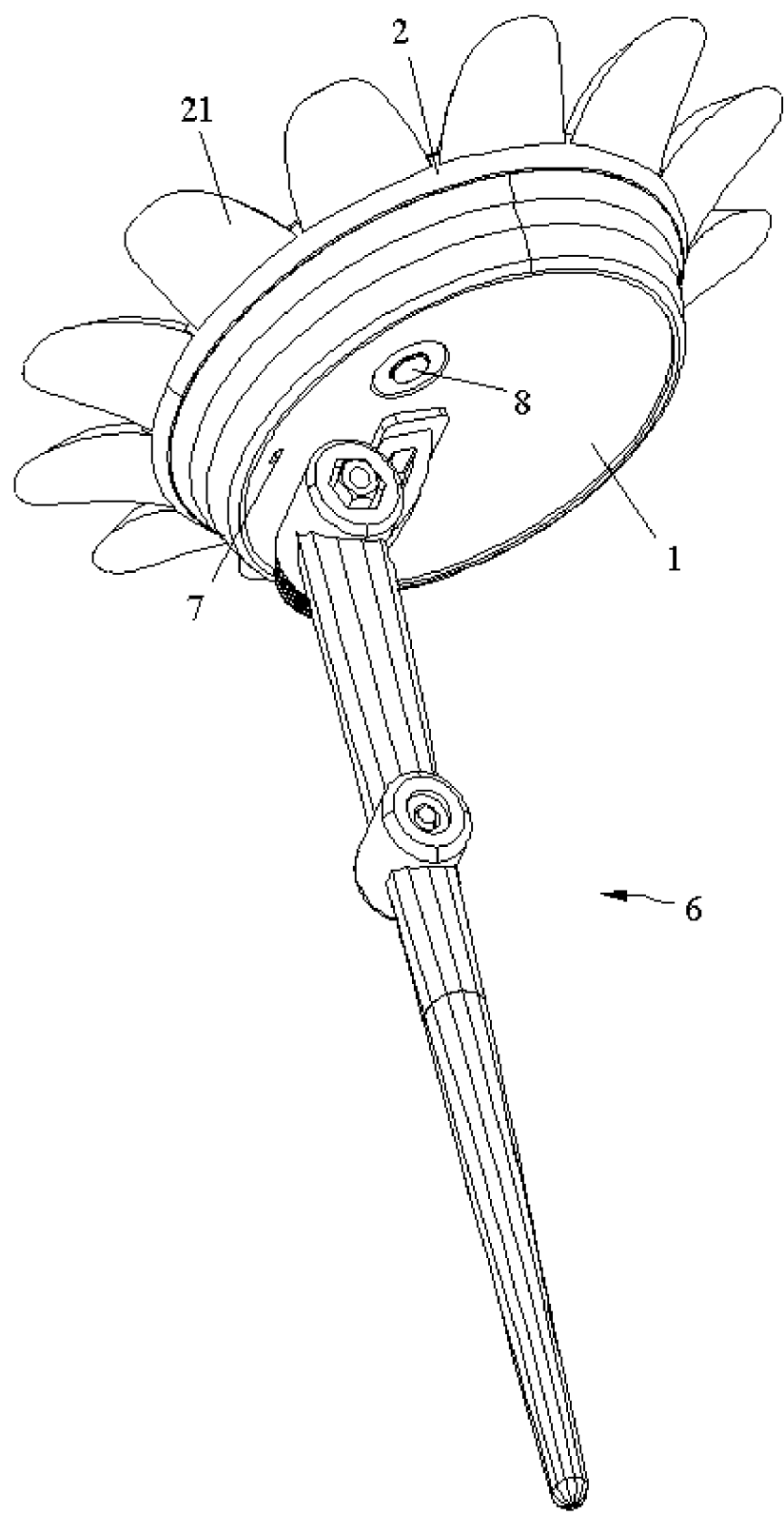
FIG. 2 is a perspective view of the embodiment from another point of view according to the invention.
Figure 3:
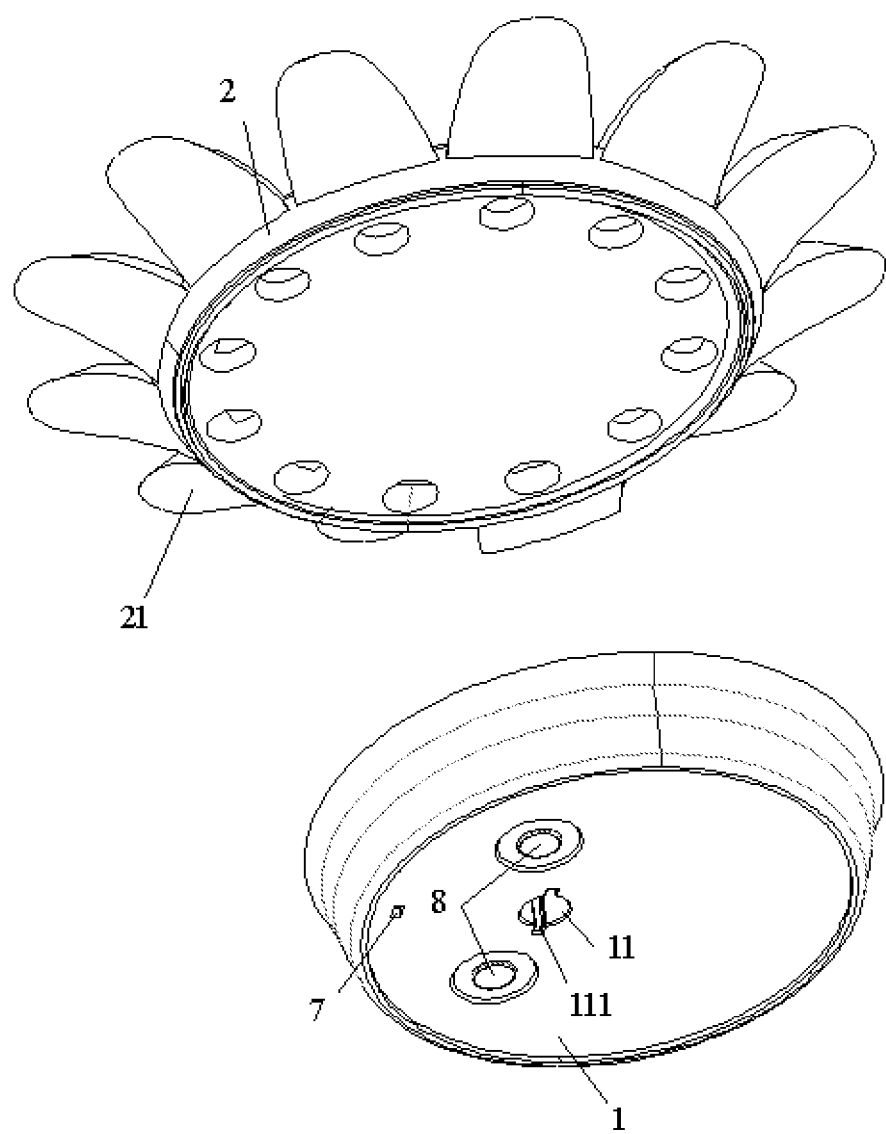
FIG. 3 is an exploded view of a first part of an embodiment according to the invention.
Figure 4:
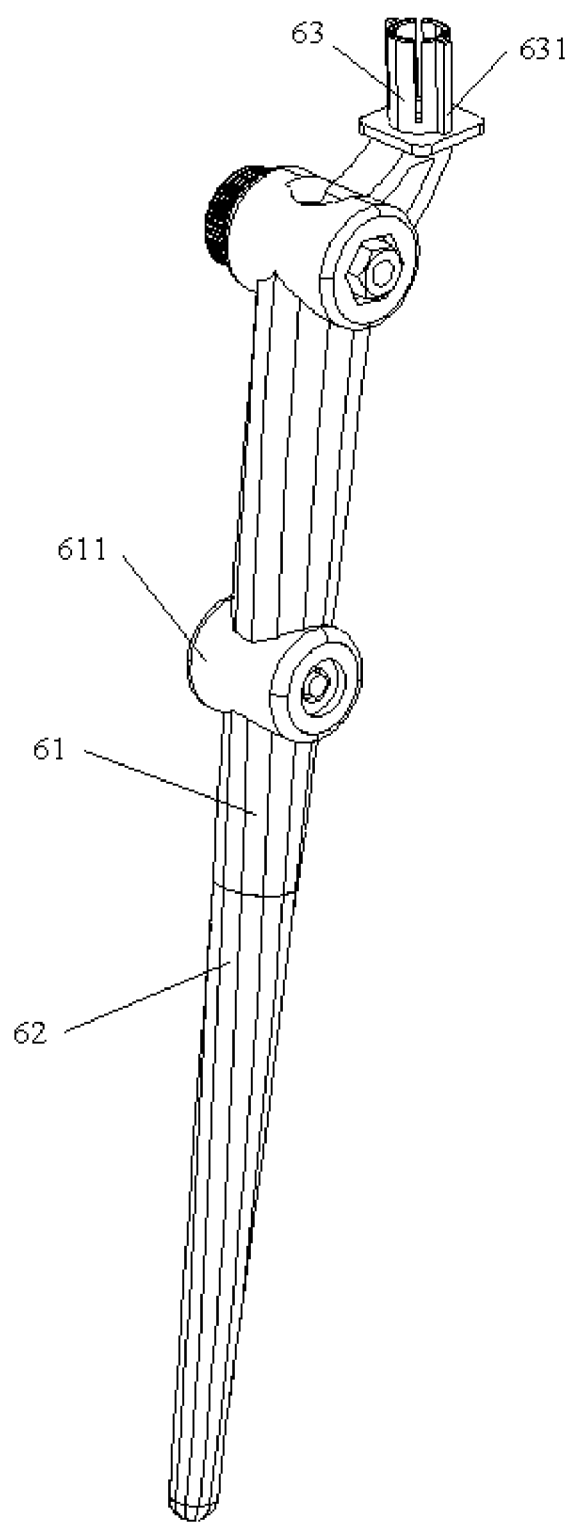
FIG. 4 is an exploded view of a second part of the embodiment according to the invention.
Figure 5:
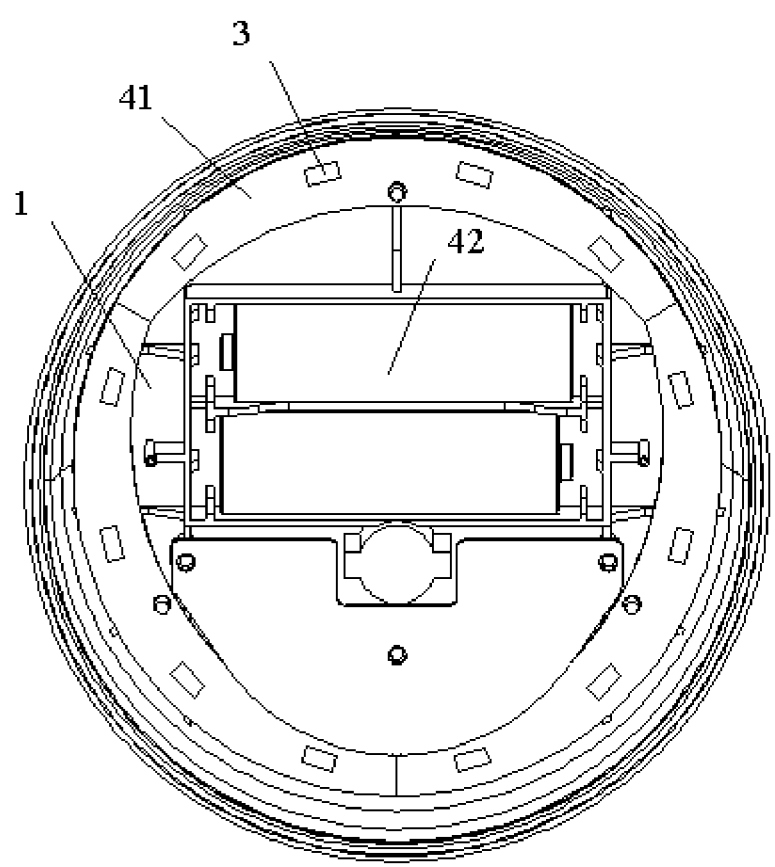
FIG. 5 is an exploded view of a third part of the embodiment according to the invention.

As shown in FIGS. 1 to 5, the invention provides a solar lamp. The solar lamp includes a base 1, a light source 3, a power unit, a lampshade 2, and a solar panel 5; the light source 3 and the power unit are both disposed on the base 1, and the power unit supplies power to the light source 3, which is for an illuminating purpose; the lampshade 2 and the base 1 are buckled with each other to form an accommodating space, in which the light source 3 and the power unit are disposed; a plurality of light guide elements 21 are circumferentially disposed on an outer side the lampshade 2, the solar panel 5 is disposed on an underside of the lampshade 2 (also disposed in the accommodating space), and the solar panel 5 is electrically connected to the power unit; and the lampshade 2 is made of a light-permeable material (which may be a colorless transparent material or a colored transparent material, which may be a faint-yellow transparent material when a warm light effect is needed, for example).

During working, the solar panel 5 receives solar light that transmits through the lampshade 2, and converts radiation energy in the solar light into electric energy to be stored in the power unit, which supplies power to the light source 3, thereby ensuring the normal operation of the light source. Meanwhile, a plurality of light guide elements 21 are designed to guide the light, which improves a light illumination effect and increases the utilization rate of the light source and the ornamental value.

In such a way, the above specific design allows the solar lamp to ensure sufficient power as compared with a traditional lamp. Specifically, the solar lamp can convert the solar radiation energy into the electric energy through the solar panel in the day time to charge the power unit, which continuously keeps sufficient power for the power unit to avoid the problem that the light source does not work due to insufficient power, therefore, the step of replacing a power battery is omitted. Furthermore, the ornamental value of the lamp is effectively increased by arranging a plurality of light guide elements 2 on the lampshade to guide the light emitted by the light source 3.

Preferably, the base 1 and the lampshade 2 are both circular, and the light guide elements 2 are arranged at interval along an outer edge of the lampshade and are annular. Further, the light guide elements 2 are petal-shaped, such that the whole lamp looks like a flower (sunflower). Therefore, the ornamental value of the lamp is greatly increased regardless of a turning-on state at night or an idle state in the day. With doubt, the lampshade and the light guide elements may also have other shapes to form various suitable decorations for people to enjoy their beauty.

In general, a solar lamp according to this embodiment is for use in outdoor regions with sufficient sunlight.

Further, the power unit includes a circuit board 41 and an accumulator battery 42 electrically connected to the circuit board 41, and said solar panel 5 is electrically connected to the circuit board 41. It can be understood that the solar lamp supplies power to the light source by using the accumulator battery at night, and charges the accumulator battery by converting the solar radiation energy into the electric energy via the solar panel in the day with sufficient sunlight.

Specifically, the light source 3 includes a plurality of LED beads, which are annularly arranged on the circuit board 41 at interval.

Further, the lampshade 2 is provided with lenses 22 at positions corresponding to the LED beads; and the lenses 22 are convexly semi-spherical. Hence, when the LED beads work, the light emitted by the LED beads irradiate inside faces of the lenses, which enlarges a light illumination area of the LED beads and changes the light illumination directions of the LED beads, thereby enhancing the illuminating capacity of the lamp.

Preferably, the lampshade 2 is fixed on the base 1 by means of ultrasonic welding, and the lamp 2 and the base 1 are sealed to increase the waterproofness, such that the invention can work stably in rainy days. Without doubt, the lampshade 2 and the base 1 may also be mounted by other means, and a rubber ring is disposed between the lampshade 2 and the base 1 to increase airtightness and waterproofness, such that the invention is applicable in water.

Specifically, the support element 6 is further disposed, which is detachably connected to the underside of the base 1. When used outdoors, the lamp can be fixed by inserting the support element 6 into earth floor. Specifically, the support element 6 includes an upper segment 61 and a lower segment 62, which are detachably connected. The upper segment 61 and the lower segment 62 are rod-like; the upper segment 61 is pivotably provided with a connecting element 63; a slot 11 allowing the insertion of the connecting element 63 is disposed at the bottom of the base 1; and the upper segment 61 is detachably mounted at the bottom of the base 1 by the cooperation of the connecting element 63 and the slot 11. In such way, the base 1 is rotatably adjustable with respect to the upper segment 61. That is, the illuminating angle of the lamp is adjustable. It should be noted that the upper segment 61 and the lower segment 62 may be disposed based on the willingness and choice of a user. If a higher height is needed, the upper segment and the lower segment may be used together; and if a lower height is needed, the lower segment may be removed, with the upper segment inserted into the earth floor only.

Preferably, the connecting element 63 is further provided with a limiting portion 631; the slot 11 is provided with a limiting groove 111 at a position corresponding to the limiting portion 631. The rotation between the base 1 and the connecting element 63 is limited by the cooperation of the limiting portion 631 and the limiting groove 111, thereby achieving a positioning effect.

Specifically, the upper segment 61 is provided with a convex drum position 611; the drum position 611 and the upper segment 61 may be of an integrally formed structure; or the drum position 611 is a sleeve element sleeved on the upper segment 61. When the lamp is inserted into the earth floor through the support element, a stress surface of the upper segment 61 may be enlarged by the drum position 611 to increase the stress tolerance of the upper segment 61.

It should be added that in order to better adjust the length of the support element 6, several connecting rods may be further disposed between the upper segment 61 and the lower segment 62; both ends of each of the several connecting rods are detachably connected with the upper segment 61 and the lower segment 62 respectively by a buckle structure or by other structures. A user may accordingly add the connecting rods of a proper length between the upper segment 61 and the lower segment 62 to increase the overall length of the support element 6, thereby adjusting the height position of the lamp after the support element 6 is inserted into the earth floor.

Specifically, the base 1 is further provided with a power interface 7, which is electrically connected to the power unit and may be configured to supply power to other external lamps, thereby connecting several lamps in series. Further, the base 1 is also provided with a button switch 8 that is electrically connected to the power unit, and the button switch 8 is configured to control the on and off of the light source 3.

It should be noted that the invention may also control the on and off of the light source, the selection of a color of the light source, and an illumining mode of the light source by using a remote controller. This relates to the prior art, and its specific principle and connection will not be described in detail herein.

The design focus of the invention lies in that the solar lamp can ensure sufficient power and stable operation mainly by its specific design as compared with a traditional lamp; and furthermore, the plurality of light guide elements are disposed on the lampshade to guide light emitted by the light source, which effectively increases the ornamental value of the lamp and keeps in line with the aesthetic trend of people.

Then, the support element is disposed, and the solar lamp when rotating is connected to the support element, such that the solar lamp according to the invention can be adjusted in illuminating angle, thereby achieving convenience in use.

Moreover, the lampshade is provided with the lenses at the positions corresponding to the LED beads, such that the illuminating effect is further improved and the utilization rate of the LED beads is increased.

Described above are merely preferred embodiments of the invention, and are not intended to limit the technical scope of the invention in any forms. Therefore, any tiny modification, equivalent variation and the like that are made to the above embodiments based on the technical essence of the invention shall be still included within the scope of the technical solutions of the invention.

What is claimed is:

1. A solar lamp, comprising a base, a light source, a power unit, a lampshade, and a solar panel, wherein the lampshade is attached to the base to form an accommodating space; the light source, the power unit, and the solar panel are all disposed in the accommodating space; the power unit is electrically connected to the solar panel and the light source; and the lampshade is made of a light-permeable material, wherein a plurality of light guide elements for guiding light are circumferentially arranged at interval along an outer edge of the lampshade, and the light guide elements are petal-shaped; the power unit comprises a circuit board, the circuit board is annular, and the light source comprises a plurality of LED beads that are arranged at interval along an outer edge of the circuit board, the lampshade is provided with lenses at positions corresponding to the LED beads, each lens corresponding to one of the LED beads and one of the plurality of light guide elements, the lenses are semi-spherical convexly upwards, and the plurality of light guide elements surround the lenses.

2. The solar lamp according to claim 1, wherein the power unit further comprises an accumulator battery electrically connected to the circuit board; the solar panel is electrically connected to the circuit board; and the solar panel during working converts solar radiation energy into electric energy to charge the accumulator battery via the circuit board.

3. The solar lamp according to claim 1, wherein the lampshade is ultrasonically welded to the base.

4. The solar lamp according to claim 1, further comprising a support element, which is detachably connected to an underside of the base.

5. The solar lamp according to claim 4, wherein the support element is provided with a connecting element, which is rotatably disposed on the support element, wherein the base is connected to the connecting element, such that the base is rotatably disposed relative to the support element.

6. The solar lamp according to claim 1, wherein the base is provided with a power interface, which is electrically connected to the power unit.

\* \* \* \* \*